(12) United States Patent
Lawther (10) Patent No.: US 7,995,901 B2
(45) Date of Patent: Aug. 9, 2011

(54) FACILITATING VIDEO CLIP IDENTIFICATION FROM A VIDEO SEQUENCE

(75) Inventor: Joel S. Lawther, East Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1059 days.

(21) Appl. No.: 11/690,308

(22) Filed: Mar. 23, 2007

(65) Prior Publication Data

US 2008/0232764 A1 Sep. 25, 2008

(51) Int. Cl.
*H04N 5/93* (2006.01)
(52) U.S. Cl. ........................................ 386/278; 386/285
(58) Field of Classification Search .................. 386/278, 386/285, 287, 281, 290
See application file for complete search history.

(56) References Cited

U.S. PATENT DOCUMENTS

| 4,987,552 | A | 1/1991 | Nakamura | 364/521 |
| 5,635,982 | A | 6/1997 | Zhang et al. | 348/231 |
| 6,377,519 | B1 | 4/2002 | Lee et al. | 369/30.04 |
| 6,452,875 | B1 | 9/2002 | Lee et al. | 369/30.04 |
| 6,757,027 | B1 | 6/2004 | Edwards et al. | 348/722 |
| 2006/0288291 | A1* | 12/2006 | Lee et al. | 715/723 |

* cited by examiner

*Primary Examiner* — Robert Chevalier
(74) *Attorney, Agent, or Firm* — Justin D. Petruzzelli (57) ABSTRACT

A system and method for facilitating video clip identification from a video sequence is provided. According to various embodiments of the present invention, a video sequence is received including a plurality of image frames. Thereafter, a first collection of image frames in the video sequence is identified, the first collection having image frames having a characteristic with a predetermined relationship with respect to the collection threshold. A first preferred image frame in the first collection of image frames is identified having a preferred image quality. Thereafter, the first preferred image frame is assigned as a beginning or an end of a video clip in the video sequence.

22 Claims, 5 Drawing Sheets

FACILITATING VIDEO CLIP IDENTIFICATION FROM A VIDEO SEQUENCE

FIELD OF THE INVENTION

This invention relates to facilitating the identification of a video clip from a video sequence. In particular, the present invention pertains to facilitating the identification of a video clip with reduced or no user intervention.

BACKGROUND OF THE INVENTION

The proliferation of digital video recording equipment for personal use has significantly increased the amount of digital video acquired by consumers. Accordingly, consumers are spending more time editing their personal videos than ever before. One common task performed by a consumer when editing a video is the identification of where a video clip should begin and end. Conventionally, this process of identifying where a video clip begins and ends has been performed manually by the user visually inspecting particular frames within a video sequence. As such, the process of identifying video clips in a video sequence can be cumbersome and unnecessarily inefficient. Accordingly, a need in the art exists for an improved process for facilitating video clip identification from a video sequence.

SUMMARY

The above described problem is addressed and a technical solution is achieved in the art by a method for facilitating video clip identification from a video sequence according to various embodiments of the present invention. For example, embodiments of the present invention pertain to such a method implemented at least in part by a computer, the method including receiving a video sequence, determining a collection threshold, and identifying a first collection of image frames in the video sequence having characteristics with a predetermined relationship with respect to the collection threshold.

According to an embodiment of the present invention, the predetermined relationship referred to above is at, below, or at or below the collection threshold. According to other embodiments of the present invention, the predetermined relationship referred to above is at, above, or at or above the audio volume threshold.

In some embodiments of the present invention, the characteristic is an audio volume level, the collection threshold is an audio volume threshold, and the predetermined relationship is an audio volume level less than the audio volume threshold. In these instances, the first collection of images frames in the video sequence is those image frames having an audio volume level less than the audio volume threshold.

In other embodiments of the present invention, the collection threshold is a motion threshold, and the characteristic of the image frames in the first collection of image frames is a motion level. In these instances, the first collection of image frames in the video sequence are identified as having a motion level with a predetermined relationship with respect to the motion threshold.

According to some embodiments of the present invention, it may be required that the first collection of image frames include at least a predetermined number of image frames or at least a predetermined playback time. If not, the first collection of image frames may be expanded to include additional image frames or may be reconfigured to include an entirely different set of image frames.

According to some embodiments of the present invention, a first preferred image frame in the first collection of image frames having a preferred image quality is identified. Thereafter, the first preferred image frame is assigned as a beginning or an end of a video clip in the video sequence. Accordingly, the process of identifying a beginning or an end of a video clip in a video sequence can be performed with reduced or no user interaction.

The first preferred image frame may be assigned as a beginning of the video clip. In this case, a second collection of image frames also may be identified, the second collection of image frames having a characteristic (e.g., an audio volume level or a motion level) with a predetermined relationship with respect to the collection threshold. In these embodiments, the second collection of image frames include different image frames than the first collection. Subsequently, a second preferred image frame in the second collection of image frames having a preferred image quality is identified and assigned as the end of the video clip in the video sequence. According to these embodiments, it may be required that no other image frames having a characteristic with the predetermined relationship with respect to the collection threshold exist between the first collection of image frames and the second collection of image frames.

According to some embodiments, it may be advantageous for the video clip to have a at least a minimum playback time. In this regard, embodiments of the present invention include determining whether a playback duration of the video clip is less than or equal to a minimum playback time threshold. If so, a third collection of image frames may be identified. The third collection of image frames may have a characteristic with the predetermined relationship with respect to the collection threshold. The third collection of image frames may include different image frames than the first collection and the second collection of image frames. In this regard, a third preferred image frame in the third collection is identified as having a preferred image quality. Thereafter, the third preferred image frame is assigned as the end of the video clip in lieu of the second preferred image frame.

According to various embodiments of the present invention, the video clip may be extracted, for example, by being stored in a computer-accessible memory.

According to various embodiments of the present invention, graphical pointers on a display may be presented to a user to identify the beginning and the end, respectively, of the video clip. A user may, via a user interface, instruct that the beginning or end of the video clip be changed.

In addition to the embodiments described above, further embodiments will become apparent by reference to the drawings and by study of the following detailed description.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION

Figure 1:
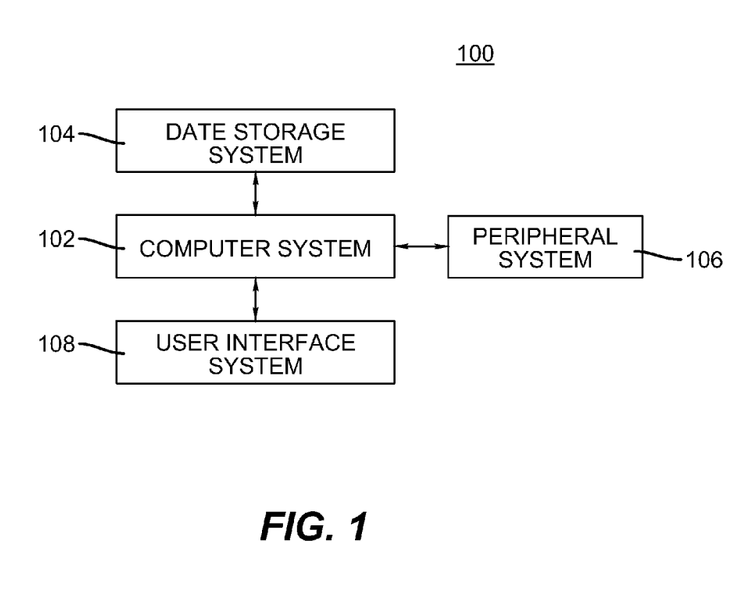
FIG. 1 illustrates a system for facilitating video clip identification from the video sequence, according to an embodiment of the present invention.

Various embodiments of the present invention pertain to facilitating video clip identification from a video sequence with reduced or no user intervention. FIG. 1 illustrates a system for facilitating video clip identification, according to an embodiment of the present invention. The system 100 includes a computer system 102, a peripheral system 106, a user interface system 108, and a data storage system 104. The data storage system 104, the peripheral system 106, and the user interface system 108 are communicatively connected to the computer system 102. The computer system includes one or more computers communicatively connected that implement the processes of the various embodiments of the present invention, including the example processes of FIGS. 2-4 described herein.

The term "computer" is intended to include any data processing device, such as a desktop computer, a laptop computer, a mainframe computer, a personal digital assistant, a Blackberry™, and/or any other device for processing data, and/or managing data, and/or handling data, whether implemented with electrical and/or magnetic and/or optical and/or biological components, and/or otherwise.

Figure 2:
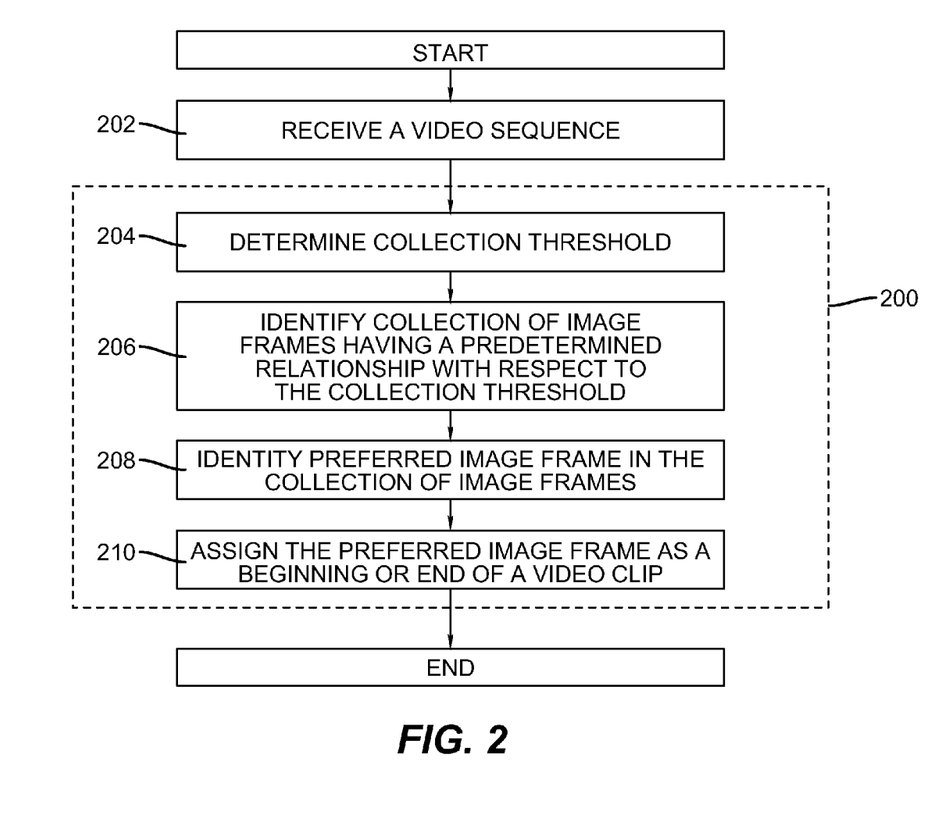
FIG. 2 illustrates, among other things, a process for assigning a beginning or an end of a video clip, according to an embodiment of the present invention.
Figure 3:
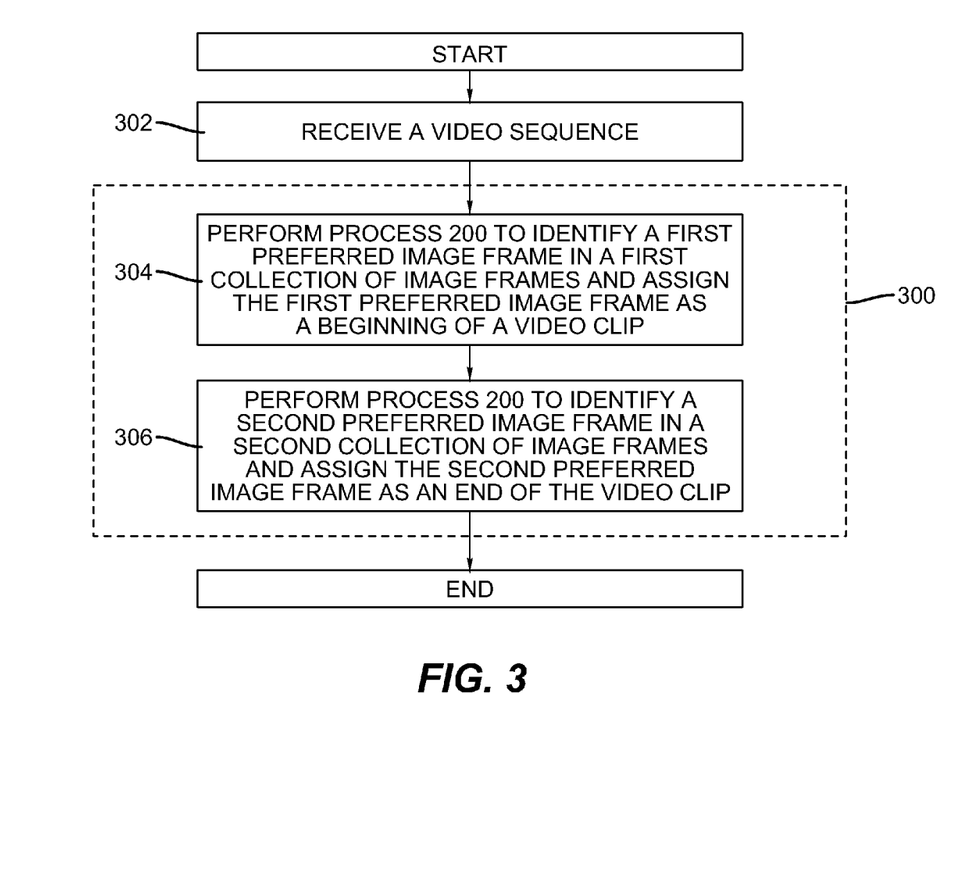
FIG. 3 illustrates, among other things, a process of assigning a beginning and an end of a video clip, according to an embodiment of the present invention.
Figure 4:
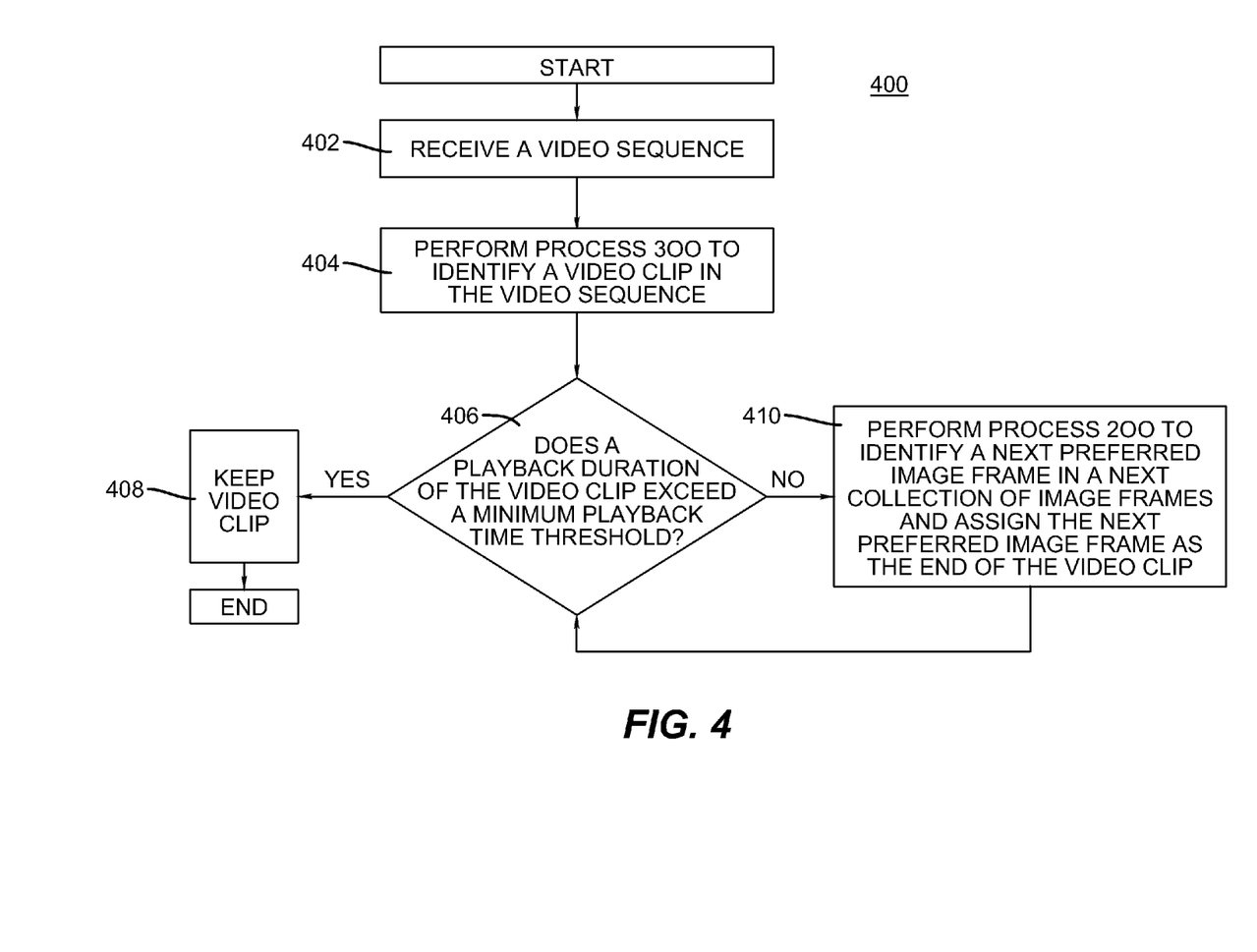
FIG. 4 illustrates a process of identifying a video clip having a playback duration that exceeds a minimum playback time threshold, according to an embodiment of the present invention.

The data storage system 104 includes one or more computer-accessible memories configured to store the information needed to execute the processes of the various embodiments of the present invention, including the example processes of FIGS. 2-4 described herein. The data-storage system 104 may be a distributed data-storage system including multiple computer-accessible memories communicatively connected to the computer system 102 via a plurality of computers and/or devices. On the other hand, the data storage system 104 need not be a distributed data-storage system and, consequently, may include one or more computer-accessible memories located within a single computer or device.

The phrase "computer-accessible memory" is intended to include any computer-accessible data storage device, whether volatile or nonvolatile, electronic, magnetic, optical, or otherwise, including but not limited to, floppy disks, hard disks, Compact Discs, DVDs, flash memories, ROMs, and RAMs.

The phrase "communicatively connected" is intended to include any type of connection, whether wired, wireless, or both, between devices, and/or computers, and/or programs in which data may be communicated. Further, the phrase "communicatively connected" is intended to include a connection between devices and/or programs within a single computer, a connection between devices and/or programs located in different computers, and a connection between devices not located in computers at all. In this regard, although the data storage system 104 is shown separately from the computer system 102, one skilled in the art will appreciate that the data storage system 104 may be stored completely or partially within the computer system 102. Further in this regard, although the peripheral system 106 and the user interface system 108 are shown separately from the computer system 102, one skilled in the art will appreciate that one or both of such systems may be stored completely or partially within the computer system 102.

The peripheral system 106 may include one or more devices configured to provide video sequences to the computer system 102. For example, the peripheral system 106 may include digital video cameras, cellular phones, regular digital cameras, or other computers. The computer system, upon receipt of a video sequence from a device in the peripheral system 106, may store such video sequence in the data storage system 104.

The user interface system 108 may include a mouse, a keyboard, a mouse and a keyboard, or any device or combination of devices from which data is input to the computer system 102. In this regard, although the peripheral system 106 is shown separately from the user interface system 108, the peripheral system 106 may be included as part of the user interface system 108.

The user interface system 108 also may include a display device, a plurality of display devices (i.e. a "display system"), a computer accessible memory, one or more display devices and a computer accessible memory, or any device or combination of devices to which data is output by the computer system 102.

Figure 5:
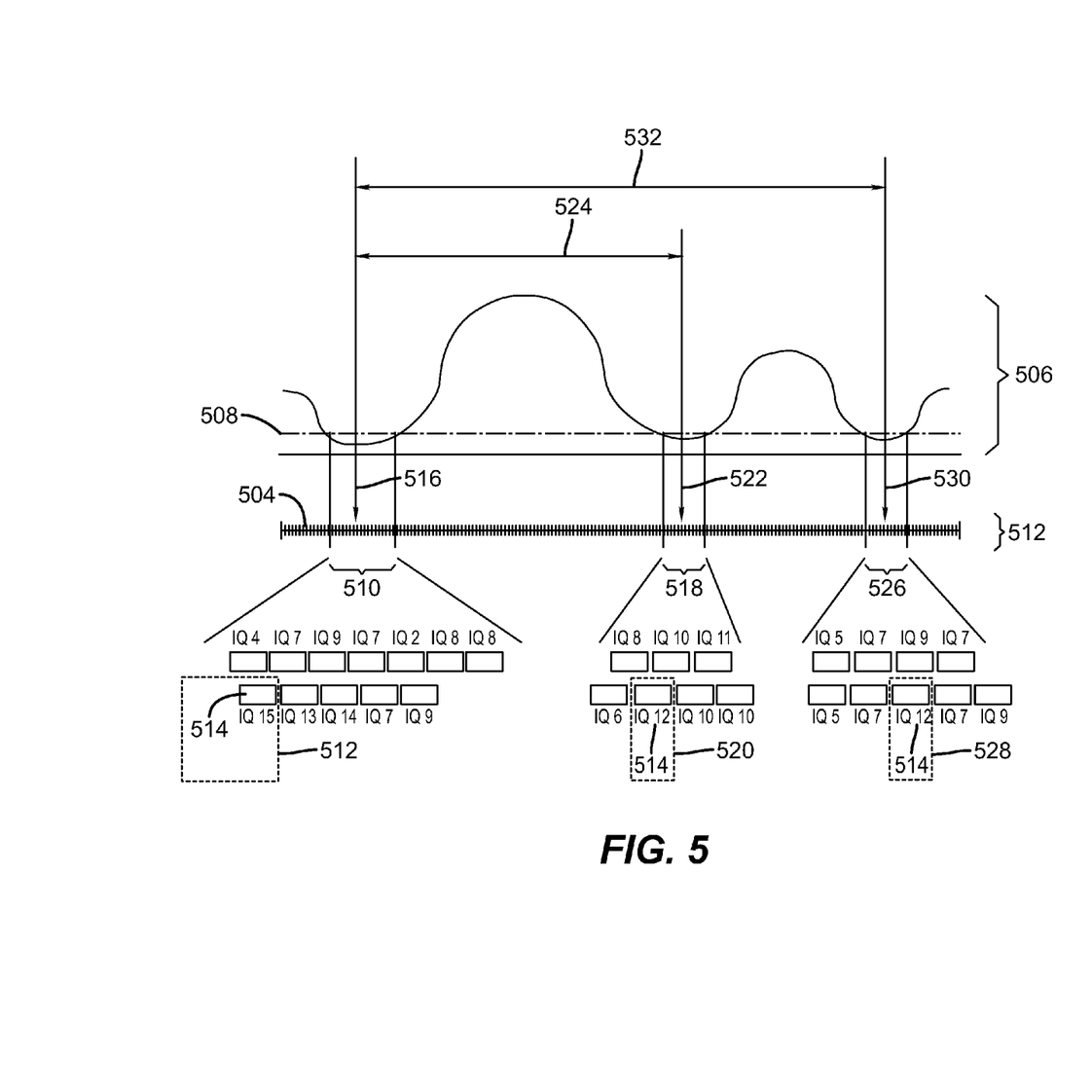
FIG. 5 illustrates an example execution of the processes of FIGS. 2-4, according to an embodiment of the present invention.

FIG. 2, in conjunction with FIG. 5 illustrates, among other things, a process 200 for assigning a beginning or an end of a video clip, according to an embodiment of the present invention. At step 202, the computer system 102 receives a video sequence from either the data storage system 104 or the peripheral system 106. FIG. 5 illustrates such a video sequence 502 having a sequence of image frames 504. It should be noted that the information presented in FIG. 5 illustrates processing performed at least in part by the computer system 102. However, the information shown in FIG. 5 may be displayed in one form or another to a user via the user interface system 108.

At step 204, the computer system 102 determines a collection threshold 508, for example, used to identify a collection of image frames in the video sequence from which a start-point or an end-point of a video clip is to be assigned. At step 206, the computer system 102 identifies a collection of image flames (510 in FIG. 5, for example), which may or may not be consecutive image frames, with a characteristic having a predetermined relationship with respect to the collection threshold 508, for example.

Example characteristics of image frames include an audio volume level or a motion level. In the case of an audio volume level, FIG. 5 illustrates an example characteristic graph 506 that would illustrate the audio volume level of the image frames 504 in the video sequence 502. In the case of a motion level, the characteristic graph 506 would illustrate the motion level existing between the image frames 504.

Example collection thresholds include an audio volume threshold or a motion threshold. Example predetermined relationships include at, below, or at or below the collection threshold or at, above, or at or above the collection threshold. In one embodiment, the collection threshold 508, for example, is an audio volume threshold, the characteristic of the image frames is an audio volume, and the predetermined relationship is at, below, or at or below the audio volume threshold. In this embodiment, which is consistent with FIG. 5, the collection of image frames 510 identified at step 206 includes a plurality of image frames having an audio volume at, below, or at or below the audio volume threshold 508, in this example.

The collection threshold may be predetermined and retrieved from the data storage system 104. Or, the collection threshold may be provided by a device in the peripheral system 106, particularly a device that acquired the video sequence. Alternatively, the collection threshold may be specified by a user via the user interface system 108. Alternatively still, the computer system 102 may analyze the video sequence 502 to determine an appropriate collection threshold 508. For example, if the collection threshold 508 is being implemented as an audio volume threshold, and a video clip is to be segmented within a region of silence, the collection threshold 508 may be set by the computer system 102 to be at an audio level near complete silence. However, if the computer system 102 determines that the video sequence includes no regions of complete or near silence, the computer system 102 may increase the audio volume threshold to compensate for background noise present in the video sequence.

An advantage of having an audio volume threshold as the collection threshold, such that a video clip is segmented in a region of silence, is that regions of silence often mark periods of inactivity in a video sequence. On the other hand, in a video sequence pertaining to a speech, for example, audio volume levels often peak before and after the speech when the audience talks amongst themselves or applauds. In these instances, it may be appropriate to segment a video clip when audio volumes are high. Accordingly, the collection threshold may be an audio volume threshold, the characteristic of the image frames may be an audio volume, and the predetermined relationship may be at, above, or at or above the audio volume threshold. In this example, the collection of image frames identified at step 206 includes a plurality of image frames having an audio volume at, above, or at or above the audio volume threshold.

Another example of a collection threshold, according to various embodiments of the present invention, is a motion threshold. In these instances, the characteristic graph 506 may be a plot of motion between image frames 504 of the video sequence 502. In cases where the video sequence 502 pertains to action, such as an athletic event, it may be desirable to initiate and/or end a video clip in image frames that exhibit little or no motion. In this case, the collection threshold 508, for example, may be set to a low motion threshold, and the collection of image frames 510, for example, would be image frames exhibiting a motion level at, below, or at or below the motion threshold 508. On the other hand, where the video sequence pertains to a speech, for example, important content of the video sequence may contain little motion. Accordingly, it may be appropriate to segment a video clip in image frames that contain relatively high motion when audience members are taking or leaving their seats, for example. Therefore, the collection threshold may be defined as a motion threshold, the characteristic of the image frames may be a motion level, and the predetermined relationship may be at, above, or at or above the motion threshold. In this example, the collection of image frames identified at step 206 includes a plurality of image frames having a motion level at, above, or at or above the motion threshold.

According to some embodiments of the present invention, the computer system 102 may determine whether or not the collection of image frames identified as step 206 (510 in FIG. 5, for example) includes at least a predetermined number of image frames or exhibit at least a predetermined playback duration. If not, the computer system 102 may add additional image frames to the collection, the additional image frames having the characteristic having the predetermined relationship with respect to the collection threshold. The process described in this paragraph may be repeated until the collection of image frames includes at least the predetermined number of image frames or exhibits at least the predetermined playback duration. In this regard, the collection of image frames (510 in FIG. 5, for example) need not include only image frames that have the characteristic having the predetermined relationship with respect to the collection threshold. Further in this regard, it may be that at least the first image frame in the collection (510 in FIG. 5, for example) has the predetermined relationship with respect to the collection threshold, and the last image frame in the collection has the predetermined relationship with respect to the collection threshold.

Returning to FIG. 2 at step 208, the computer system 102 identifies a preferred image frame in the collection of image frames identified at step 206, such as the collection of image frames 510 in FIG. 5. In this regard, the preferred image frame may have a preferred image quality among the other image frames in the collection of image frames 510. Any technique for evaluating the quality of an image frame, known in the art, may be used at step 208. For example, a key frame may be identified within the first collection 510. Alternatively, or in addition, the image frames in the collection 510 may be assigned a quality score an image quality score 514 and the image frame having the highest image quality score, in this case image frame 512, may be identified as the preferred image frame. A graphical indicia, such as pointer 516 may be presented on a display in the user interface system 108 marking the location of the preferred image frame 512 in the video sequence 502. Subsequently, the preferred image frame may be assigned by the computer system 102 as the beginning or end of a video clip. In the example of FIG. 5, the preferred image frame 512 is identified as the beginning of the video clip.

FIG. 3 illustrates, among other things, a process 300 for assigning a beginning and an end of a video clip, according to an embodiment of the present invention. At step 302, the computer system 102 receives a video sequence as previously described. At step 304, the process 200, described with respect to FIG. 2, is executed to identify a first preferred image frame in a first collection of image frames and to assign the first preferred image frame as a beginning of a video clip. In the example of FIG. 5, step 304 would identify image frame 512, marked by pointer 516 as the beginning of a video clip. Thereafter, the process 200 is implemented at step 306 to identify a second preferred image frame in a second collection of image frames and to assign the second preferred image frame as an end of the video clip.

In the example of FIG. 5, the second collection of image frames is identified with reference numeral 518. Depending upon design choice, the second collection of image frames 518 may or may not be the immediate next collection of image frames after the first collection of image frames 516 that has a characteristic having the predetermined relationship with the collection threshold 508. In other words, there may or may not be a collection of image frames between the first collection 516 and the second collection 518 that has a characteristic having the predetermined relationship with the collection threshold 508. To elaborate, depending upon design choice, it may be desirable to ensure that the second collection of image frames, 518, for example, include at least a predetermined number of image frames. If not, a next collection of image frames having the predetermined relationship with the collection threshold 508 may be identified in lieu thereof.

Also in the example of FIG. 5, image frame 520 may be identified as the second preferred image frame because it has the highest image quality score 514. The second preferred image frame 520 may be marked with graphical indicia, such as pointer 522 on a display in the user interface system 108. The output of FIG. 3 produces an identified video clip 524. The beginning of such video clip 524 is the image frame 512 marked by pointer 516, and the end of such video clip 522 is image frame 514 marked by pointer 522.

According to an embodiment of the present invention, it may be desirable to ensure that the video clip 524 has a playback duration that exceeds a minimum playback time threshold. For example, it may be desirable to have the video clip 524 be at least three to five seconds. If the duration of the video clip 524 does not exceed a predetermined playback time threshold, a next collection of image frames may be identified in lieu thereof. FIG. 4 illustrates such a case, and illustrates a process of identifying a video clip having a playback duration that exceeds a minimum playback time threshold.

At step 402, the computer system 102 receives a video sequence as previously described. At step 404, the process 300 is executed to identify a video clip in the video sequence. At step 406, the computer system 102 determines whether the video clip has a playback duration that exceeds a minimum playback time threshold. If the video clip does exceed the minimum playback time threshold, the end point of such video clip does not change at step 408. However, if the video clip, 524, for example, does not have a playback duration that exceeds the minimum playback time threshold, process 200, described with respect to FIG. 2 is executed to identify a next collection of image frames and a next preferred image frame. Alternatively, instead of identifying a next collection of image frames, a new preferred image frame appearing later in the collection 518, for example, may be chosen to increase the duration of the video clip 524. Regardless, the next preferred image frame is then identified as the new end of the video clip at step 410.

In the example of FIG. 5, if it is determined that the video clip 524 does not exceed a minimum playback time threshold, a next collection of image frames having the predetermined relationship with respect to the collection threshold is identified. In this example, a third collection of image frames 526 is identified. In this regard, the third preferred image frame is identified as image frame 528, because it exhibits the highest image quality score 514. Graphical indicia, such as pointer 530 may be displayed on a display to a user via the user interface system 108 to illustrate the new end point of the video clip, now 532.

Having identified a new end point for the video clip, the computer system 102 returns to step 406 to determine whether the new video clip, 532 for example, exceeds a minimum playback time threshold. If not, then a next preferred image frame is identified again at step 410. Otherwise, the end point of the video clip is maintained at step 408.

It is to be understood that the exemplary embodiments are merely illustrative of the present invention and that many variations of the above-described embodiments can be devised by one skilled in the art without departing from the scope of the invention. It is therefore intended that all such variations be included within the scope of the following claims and their equivalents.

PARTS LIST

100 System
102 Computer system
104 Data storage system
106 Peripheral system
108 User interface system
200 Process for assigning a beginning or end of a video clip
202 Step of receiving a video sequence
204 Step of determining a collection threshold
206 Step of identifying a collection of image frames having a predetermined relationship with respect to the collection threshold
208 Step of identifying a preferred image frame in the collection of image frames
210 Step of assigning the preferred image frame as a beginning or end of a video clip
300 Process of assigning a beginning and an end of a video clip
302 Step of receiving a video sequence
304 Step of assigning a beginning of a video clip
306 Step of assigning an end of the video clip
400 Process of identifying a video clip having a playback duration that exceeds a minimum playback time threshold
402 Step of receiving a video sequence
404 Step of assigning a beginning and an end of a video clip
406 Step of determining whether the video clip has a playback duration that exceeds a minimum playback time threshold
408 Step of validating the video clip playback duration
410 Step of assigning a new end of the video clip
502 Video sequence
504 Image frame
506 Characteristic graph
508 Collection threshold
510 First collection of image frames
512 First preferred image frame in the first collection
514 Quality score
516 First graphical pointer to the beginning of a video clip
518 Second collection of image frames
520 Second preferred image frame in the second collection
522 Second graphical pointer to the end of the video clip
524 Video clip
526 Third collection of image frames
528 Third preferred image frame in the third collection
530 Third graphical pointer to the end of the video clip
532 Revised video clip

What is claimed is:

1. A method for facilitating video clip identification from a video sequence comprising a plurality of image frames, the method implemented at least in part by a computer and comprising the steps of:
    receiving the video sequence;
    determining an audio volume threshold;
    identifying a first collection of image frames in the video sequence including at least some image frames having an audio volume level with a predetermined relationship with respect to the audio volume threshold;
    identifying a first preferred image frame in the first collection having a preferred image quality; and
    assigning the first preferred image frame as a beginning or an end of a video clip in the video sequence.

2. The method of claim 1, wherein the step of identifying the first collection includes identifying the first collection of image frames such that at least (a) the first image frame in the first collection has an audio volume level with the predetermined relationship with respect to the audio volume threshold, and (b) the last image frame in the first collection has an audio volume level with the predetermined relationship with respect to the audio volume threshold.

3. The method of claim 1, wherein the predetermined relationship is at, below, or at or below the audio volume threshold.

4. The method of claim 1, wherein the predetermined relationship is at, above, or at or above the audio volume threshold.

5. The method of claim 1, wherein the step of identifying the first collection requires that the first collection of image frames comprises at least a predetermined number of image frames or at least a predetermined playback time.

6. The method of claim 1, wherein the assigning step assigns the first preferred image frame as a beginning of the video clip in the video sequence, and the method further comprises the steps of:
identifying a second collection of image frames in the video sequence including at least some image frames having an audio volume level with the predetermined relationship with respect to the audio volume threshold, the second collection of image frames including different image frames than the first collection;
identifying a second preferred image frame in the second collection having a preferred image quality; and
assigning the second preferred image frame as an end of the video clip in the video sequence.

7. The method of claim 6, wherein the predetermined relationship is at, below, or at or below the audio volume threshold.

8. The method of claim 6, wherein the predetermined relationship is at, above, or at or above the audio volume threshold.

9. The method of claim 6, wherein the second collection of image frames comprises image frames that exist later in the video sequence than the image frames in the first collection.

10. The method of claim 9, wherein no other image frames having an audio volume level with the predetermined relationship with respect to the audio volume threshold exist between the first collection of image frames and the second collection of image frames.

11. The method of claim 6, further comprising the steps of:
determining whether a playback duration of the video clip is less than or equal to a minimum playback time threshold, and if so, the method further comprises the steps of:
identifying a third collection of image frames in the video sequence including at least some image frames having an audio volume level with the predetermined relationship with respect to the audio volume threshold, the third collection of image frames including different image frames than the first collection and the second collection;
identifying a third preferred image frame in the third collection having a preferred image quality; and
assigning the third preferred image frame as the end of the video clip in the video sequence.

12. The method of claim 11, wherein the minimum playback time threshold is between approximately three seconds and five seconds.

13. The method of claim 6, further comprising the step of extracting the video clip from the video sequence.

14. The method of claim 6, further comprising the step of presenting on a display, information pertaining to the first preferred image frame and the second preferred image frame.

15. The method of claim 14, wherein the presenting step (a) presents a first graphical pointer on the display highlighting a location of the first preferred image frame in the video sequence, and (b) presents a second graphical pointer on the display highlighting a location of the second preferred image frame in the video sequence.

16. The method of claim 14, further comprising the step of receiving input from a user interface instructing a frame change for either the first preferred image frame or the second preferred image frame.

17. The method of claim 1, wherein the step of identifying the first preferred image frame comprises assigning a quality score to each of the image frames in the first collection, wherein the first preferred image frame is an image frame in the first collection having a highest quality score.

18. A method for facilitating video clip identification from a video sequence comprising a plurality of image frames, the method implemented at least in part by a computer and comprising the steps of:
receiving the video sequence;
determining a motion threshold;
identifying a first collection of image frames in the video sequence including at least some image frames having a motion level with a predetermined relationship with respect to the motion threshold;
identifying a first preferred image frame in the first collection having a preferred image quality; and
assigning the first preferred image frame as a beginning or an end of a video clip in the video sequence.

19. The method of claim 18, wherein the predetermined relationship is at, below, or at or below the motion threshold.

20. The method of claim 18, wherein the predetermined relationship is at, above, or at or above the motion threshold.

21. The method of claim 18, wherein the assigning step assigns the first preferred image frame as a beginning of the video clip in the video sequence, and the method further comprises the steps of:
identifying a second collection of image frames in the video sequence including at least some image frames having a motion level with the predetermined relationship with respect to the motion threshold, the second collection of image frames including different image frames than the first collection;
identifying a second preferred image frame in the second collection having a preferred image quality; and
assigning the second preferred image frame as an end of the video clip in the video sequence.

22. The method of claim 21, further comprising the steps of:
determining whether a playback duration of the video clip is less than or equal to a minimum playback time threshold, and if so, the method further comprises the steps of:
identifying a third collection of image frames in the video sequence including at least some image frames having a motion level with the predetermined relationship with respect to the motion threshold, the third collection of image frames including different video frames than the first collection and the second collection;
identifying a third preferred image frame in the third collection having a preferred image quality; and
assigning the third preferred image frame as the end of the video clip in the video sequence.

* * * * *